US012474913B2

(12) United States Patent
Lei

(10) Patent No.: US 12,474,913 B2
(45) Date of Patent: *Nov. 18, 2025

(54) AGGREGATED COMMON PACKAGE OTA BROADCAST

(71) Applicant: FORD GLOBAL TECHNOLOGIES, LLC, Dearborn, MI (US)

(72) Inventor: Oliver Lei, Windsor (CA)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 206 days.

This patent is subject to a terminal disclaimer.

(21) Appl. No.: 18/048,683

(22) Filed: Oct. 21, 2022

(65) Prior Publication Data

US 2024/0134627 A1 Apr. 25, 2024
US 2024/0231795 A9 Jul. 11, 2024

(51) Int. Cl.
*G06F 8/65* (2018.01)
*G06F 8/71* (2018.01)
*G07C 5/00* (2006.01)

(52) U.S. Cl.
CPC .......... *G06F 8/65* (2013.01); *G06F 8/71* (2013.01); *G07C 5/008* (2013.01)

(58) Field of Classification Search
CPC .......... G06F 8/65; G06F 8/71; G07C 5/008
See application file for complete search history.

(56) References Cited

U.S. PATENT DOCUMENTS 8,010,136 B2 * 8/2011 MacDonald ......... H04L 51/214
455/466
8,151,305 B2 * 4/2012 Doerr ............. H04N 21/4381
725/62
10,567,471 B2 * 2/2020 Patsiokas ............. H04L 69/14
(Continued)

FOREIGN PATENT DOCUMENTS

EP 3002895 A1 4/2016

OTHER PUBLICATIONS

ATSC 3.0 Broadcasts to Deliver Data to Connected and Autonomous Vehicles, retrieved from https://www.atsc.org/newsletter/atsc-3-0-broadcasts-deliver-data-connected-autonomous-vehicles, Jul. 12, 2019.
(Continued)

*Primary Examiner* — Lewis A Bullock, Jr.
*Assistant Examiner* — Theodore E Hebert
(74) *Attorney, Agent, or Firm* — Joseph Zane; BROOKS KUSHMAN P.C.

(57) ABSTRACT

Delivering software updates is provided. An update server in communication with an Advanced Television Systems Committee (ATSC) transmitter and with a cellular network broadcasts a probe message to a plurality of vehicles. The update server receives probe results from the plurality of vehicles, responsive to the broadcasting. The update server analyzes the probe results to determine software updates to send to the plurality of vehicles. The update server generates an aggregate common package including the software updates in common with at least a subset of the plurality of vehicles. The update server, sends using the ATSC transmitter, the aggregate common package to the plurality of vehicles. The update server sends, over the cellular network, any remaining portion of the software updates not included in the aggregate common package to the plurality of vehicles.

10 Claims, 6 Drawing Sheets

(56) References Cited

U.S. PATENT DOCUMENTS

| | | | |
|---|---|---|---|
| 11,249,746 B1* | 2/2022 | Lei | H04H 20/62 |
| 2009/0133012 A1* | 5/2009 | Shih | H04N 21/6543 |
| | | | 717/169 |
| 2011/0176060 A1* | 7/2011 | Lee | H04L 1/0001 |
| | | | 375/259 |
| 2011/0222549 A1* | 9/2011 | Connelly | H04L 41/0213 |
| | | | 717/173 |
| 2014/0282470 A1* | 9/2014 | Buga | G06F 8/65 |
| | | | 717/170 |
| 2016/0335073 A1* | 11/2016 | Hong | G07C 5/008 |
| 2017/0177321 A1* | 6/2017 | Seastrom | H04N 21/4432 |
| 2017/0302982 A1* | 10/2017 | Simpson | H04N 21/2407 |
| 2019/0163537 A1* | 5/2019 | Senapati | G06F 8/65 |
| 2019/0220011 A1* | 7/2019 | Della Penna | G07C 5/085 |
| 2019/0391800 A1* | 12/2019 | Lin | G06F 8/65 |
| 2020/0077125 A1* | 3/2020 | An | H04N 21/2362 |
| 2021/0165646 A1* | 6/2021 | Mueck | G06F 8/65 |
| 2022/0188095 A1* | 6/2022 | Chen | G07C 5/008 |
| 2024/0134627 A1* | 4/2024 | Lei | G06F 8/71 |

OTHER PUBLICATIONS

Yang et al., Centralized Caching and Delivery of Correlated Contents Over Gaussian Broadcast Channels, arXiv:1906.09970v1 [cs.IT] Jun. 21, 2019.

\* cited by examiner

AGGREGATED COMMON PACKAGE OTA BROADCAST

TECHNICAL FIELD

Aspects of the present disclosure relate to use aggregated common packages for delivery of portions of updates to vehicles across different models.

BACKGROUND

To update a software version of a component of a vehicle, the vehicle may be driven to a dealership and serviced by a technician. The technician may utilize a system that tracks the individual software levels of every component in the vehicle as well as available software updates. The technician may manually apply the software updates indicated by the system and record any changes back into the system.

Over-the-air (OTA) software updates are a technique by which software of a vehicle may be updated via a wireless connection. Using an embedded modem or other wireless data connection to the vehicle, OTA updates allow software changes on vehicle electronic control units (ECUs) without a service visit.

Sometimes referred to as NextGen television (TV), Advanced Television Systems Committee (ATSC) 3.0 is a standard for television broadcasting created by the ATSC. As compared to earlier TV standards, ATSC 3.0 supports features such as 4K resolution and high dynamic range (HDR) support.

Unicast data transmission refers to a one-to-one transmission from a first point in a network to another point. A unicast transmission is typically sent from an origin (or sender) to a destination (or recipient). Multicast or broadcast transmission refers to a one-to-many transmission from one point in the network to multiple destination points.

SUMMARY

In one or more illustrative examples, a system for delivering software updates is provided. An update server is in communication with an ATSC transmitter and with a cellular network. The update server is programmed to broadcast a probe message to a plurality of vehicles; receive probe results from the plurality of vehicles, responsive to the broadcast; analyze the probe results to determine software updates to send to the plurality of vehicles; generate an aggregated common package including the software updates in common with at least a subset of the plurality of vehicles; send the aggregate common package to the plurality of vehicles using the ATSC transmitter; and send any remaining portion of the software updates not included in the aggregate common package to the plurality of vehicles over the cellular network.

In one or more illustrative examples, a method for delivering software updates is provided. An update server in communication with an ATSC transmitter and with a cellular network broadcasts a probe message to a plurality of vehicles. The update server receives probe results from the plurality of vehicles, responsive to the broadcasting. The update server analyzes the probe results to determine software updates to send to the plurality of vehicles. The update server generates an aggregate common package including the software updates in common with at least a subset of the plurality of vehicles. The update server sends using the ATSC transmitter, the aggregate common package to the plurality of vehicles. The update server sends, over the cellular network, any remaining portion of the software updates not included in the aggregate common package to the plurality of vehicles.

In one or more illustrative examples, a vehicle for receiving software updates is provided. The vehicle includes an ATSC receiver and a telematics control unit (TCU) in communication over a cellular network. The TCU is programmed to, responsive to receipt of a probe message, broadcast from an update server to a plurality of vehicles, send, via the cellular network, probe results to the update server indicate one or more of a vehicle model of the vehicle to be updated, ECU hardware versions of ECUs of the vehicle to be updated, and/or software versions of the ECUs of the vehicle to be updated. The TCU is further programmed to receive, from the update server via the ATSC receiver, an aggregate common package including the software updates in common with at least a subset of the plurality of vehicles, receive, from the update server over the cellular network, any remaining portion of the software updates not included in the aggregate common package, and install the software updates received via the ATSC receiver and via the cellular network.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

Broadcast technology, such as ATSC 3.0 NextGen, can broadcast data to all vehicles with ATSC 3.0 receivers in a region. By using a broadcast service, channel resources may be saved as compared to a unicast model of OTA delivery via cellular to vehicle. The more vehicles are targeted, the more the resources that may be saved. However, the vehicles may have many configurations, which may depend on factors such as the model, year, features, trim level, etc. of the vehicle. As a result, the desired OTA updates may differ across vehicle models. To use broadcast to deliver OTA updates, a server may be required to make different OTA software package for each vehicle model. This may lower the target vehicle volumes for each broadcast. As a result, more broadcasts need to be performed. In some instances, if the vehicle volume is low, the broadcast OTA resources may actually be higher than the cellular resource usage to deliver the updates via unicast.

An OTA approach is described herein, that utilizes aggregated common packages for delivery of portions of updates to vehicles across different models. The server may broadcast the common package to multiple vehicle models via ATSC. The common package may contain a collection of portions of OTA updates that are required for various vehicles, although the common package may include more files that an individual vehicle model requires. The files in the aggregated common package may contain indications of which updates are for which vehicle models. Thus, a vehicle may ignore files that are not intended for this vehicle. Remaining packages that are specific to the vehicle may be sent via unicast. As a result, the overall network resource usage for all vehicles in a region may be reduced.

Figure 1:
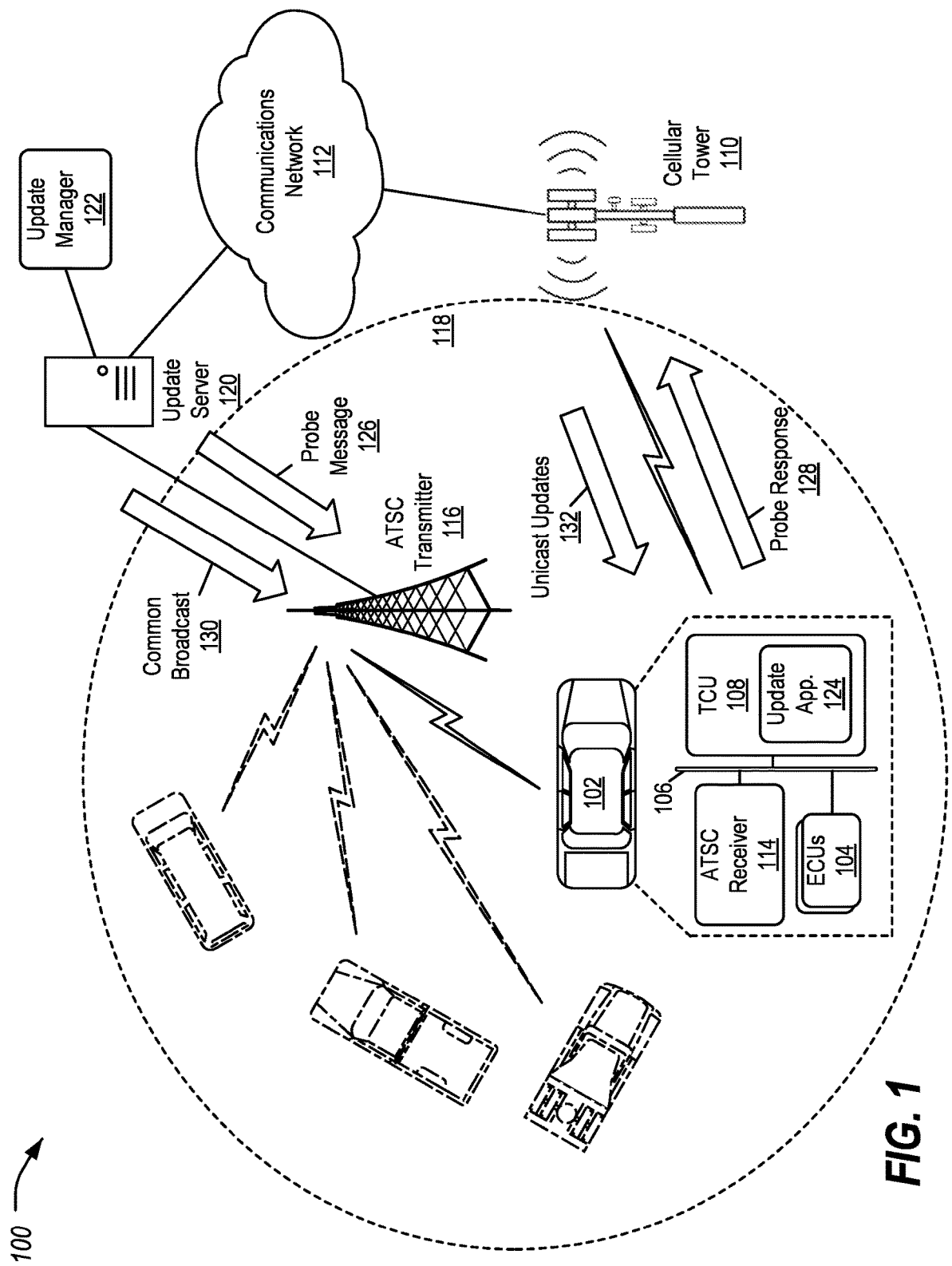
FIG. 1 illustrates an example system for use of ATSC and cellular networking for providing OTA updates to vehicles.

FIG. 1 illustrates an example system 100 for use of ATSC and cellular networking for providing OTA updates to vehicles 102. As shown, the system 100 includes a vehicle 102 having one or more ECUs 104, one or more vehicle buses 106, and a TCU 108. The TCU 108 may allow the vehicle 102 to communicate with a cellular network 112. The vehicle 102 may further include an ATSC receiver 114 configured to allow the vehicle 102 to receive information from an ATSC transmitter 116 operating in a geographic area 118. An update server 120 may be configured to execute an update manager application 122, while the TCU 108 of the vehicle 102 may be configured to execute an update application 124. The update server 120 may utilize the update manager application 122 to broadcast a probe message 126 to the vehicles 102, analyze probe results 128 sent via the update application 124, generate and broadcast an aggregate common package 130 via the ATSC transmitter 116, and send any remaining OTA updates to the vehicles 102 via unicast updates 132 using the cellular network 112. It should be noted that the system 100 shown in FIG. 1 is merely an example, and systems having more, fewer, and different arrangements of elements may be used.

The vehicle 102 may include various other types of passenger vehicles, such as sedans, crossover utility vehicles (CUVs), vans, sport utility vehicles (SUVs), trucks, recreational vehicles (RVs), scooters, or other mobile machines for transporting people or goods. In many cases, the vehicle 102 may be powered by an internal combustion engine. In such cases, the fuel source may be gasoline or diesel fuel. As another possibility, the vehicle 102 may be a hybrid electric vehicle (HEV) powered by both an internal combustion engine and one or more electric motors, such as a series hybrid electric vehicle, a parallel hybrid electric vehicle, or a parallel/series hybrid electric vehicle. As yet a further possibility, the vehicle 102 may be an electric vehicle (EV) powered by electric motors without an internal combustion engine. As the type and configuration of vehicles 102 may vary, the capabilities of the vehicles 102 may correspondingly vary. As some other possibilities, vehicles 102 may have different capabilities with respect to passenger capacity, towing ability and capacity, and storage volume. For title, inventory, and other purposes, the vehicle 102 may be associated with a unique identifier, such as a vehicle identification number (VIN).

The vehicle 102 may include a plurality of ECUs 104 configured to perform and manage various vehicle 102 functions under the power of the vehicle battery and/or drivetrain. In many examples, the vehicle ECUs 104 may be discrete devices. However, in other examples one or more of the ECUs 104 may share physical hardware, firmware, and/or software, such that the functionality from multiple ECUs 104 may be integrated into a single ECUs 104, and that the functionality of various such ECUs 104 may be distributed across a plurality of ECUs 104.

As some non-limiting vehicle ECU 104 examples: a powertrain ECU 104 may be configured to provide control of engine operating components (e.g., idle control components, fuel delivery components, emissions control components, etc.) and for monitoring status of such engine operating components (e.g., status of engine codes); a body ECU 104 may be configured to manage various power control functions such as exterior lighting, interior lighting, keyless entry, remote start, and point of access status verification (e.g., closure status of the hood, doors and/or trunk of the vehicle 102); a radio transceiver ECU 104 may be configured to communicate with key fobs, mobile devices, or other local vehicle 102 devices; an autonomous ECU 104 may be configured to provide commands to control the powertrain, steering, or other aspects of the vehicle 102; a climate control management ECU 104 may be configured to provide control of heating and cooling system components (e.g., compressor clutch, blower fan, temperature sensors, etc.); a global positioning system (GPS) ECU 104 may be configured to provide vehicle location information; and a human-machine interface (HMI) ECU 104 may be configured to receive user input via various buttons or other controls, as well as provide vehicle status information to a driver, such as fuel level information, engine operating temperature information, and current location of the vehicle 102.

The vehicle bus 106 may include various methods of communication available between the vehicle ECUs 104, as well as between the TCU 108 and the vehicle ECUs 104. As some non-limiting examples, the vehicle bus 106 may include one or more of a controller area network (CAN), an Ethernet network, and a media-oriented system transfer (MOST) network. While only a single vehicle bus 106 is illustrated, it should be noted that in many examples, multiple vehicle buses 106 are included, with a subset of the ECUs 104 connected to each vehicle bus 106.

The TCU 108 may include network hardware configured to facilitate communication between the vehicle ECUs 104 and with other devices of the system 100. For example, the TCU 108 may include or otherwise access a cellular modem configured to facilitate communication with other vehicles 102 or with infrastructure. For instance, the TCU 108 may wirelessly communicate with cellular towers 110 to access a cellular network 112. While only one cellular tower 110 is shown, it should be noted that the cellular network 112 typically includes many cellular towers 110, each assigned to provide connectivity to a different geographic area 118 (e.g., cells).

The vehicle 102 may also include an ATSC receiver 114. The ATSC receiver 114 may be a component of the vehicle 102 configured to receive ATSC transmissions. The ATSC receiver 114 may be configured to perform IP-based delivery of video content as well as Internet content and services. In some instances, ATSC 3.0 may be used to provide Internet access to areas where broadband Internet is unavailable.

The ATSC transmitter 116 may be configured to provide ATSC transmissions that may be received by the ATSC receiver 114. In many cases the ATSC transmitter 116 may be configured to provide TV signals to a geographic area 118 within reach of the signals from the ATSC transmitter 116. As shown, the vehicle 102 (as well as other vehicles) are within the geographic area 118 of the ATSC transmitter 116.

An update server 120 may be in communication with the cellular network 112 and the ATSC transmitter 116. The update server 120 may be configured to execute an update manager application 122 configured to perform aspects of providing OTA updates to the vehicles 102. The TCU 108 of the vehicle 102 may, similarly be configured to execute an update application 124 to perform aspects of receiving OTA updates to the vehicles 102.

The update server 120 may be configured to utilize the update manager application 122 to send probe messages 126 to the vehicles 102. The update application 124 may receive this message via the TCU 108, and may identify the vehicle 102 model, ECU 104 hardware and/or software versions, and/or other aspects of the vehicle 102 that may relate to what OTA updates, if any, should be provided to the vehicle 102. These details may be referred to as probe results 128. Responsive to receipt of the probe message 126, the update application 124 may be configured to cause the TCU 108 to send the probe results 128 to the update server 120 in response. The probe results 128 may also indicate which, if any of the ATSC transmitters 116 that the ATSC receiver 114 is receiving transmissions from.

Using this information, the update manager applications 122 may identify which OTA updates are needed for the vehicles 102, as well as which of the vehicles 102 are within the geographic area 118 of which ATSC receiver 114. The update manager application 122 may be further configured to identify the number of vehicles 102 and generate an aggregate common package 130 including OTA updates that are useful for the vehicles 102 within the geographic area 118. Further aspects of the generation of the aggregate common package 130 are discussed with respect to FIGS. 2-3.

Figure 2:
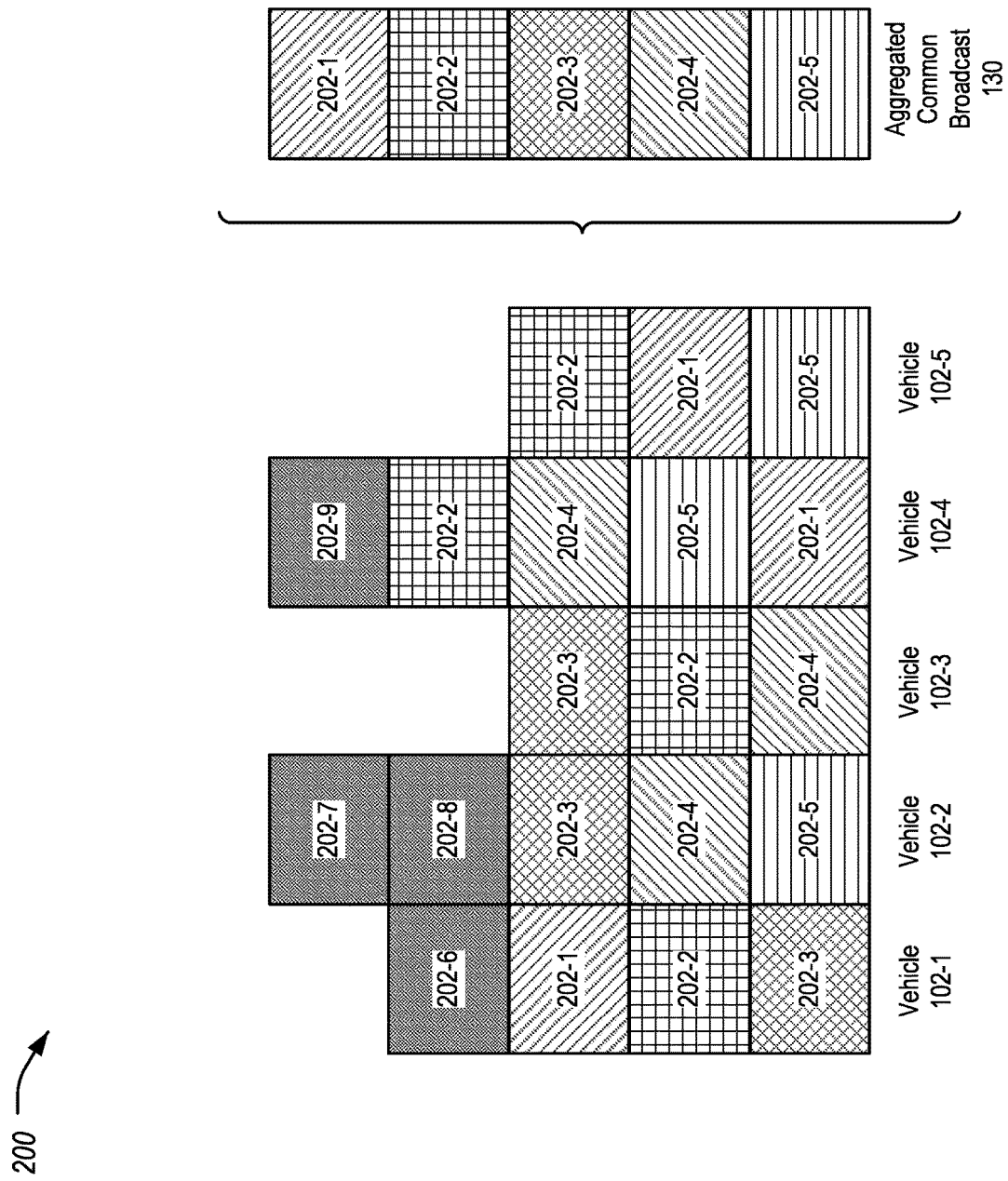
FIG. 2 illustrates an example of the OTA updates that are required for an example set of five vehicles.

FIG. 2 illustrates an example 200 of the OTA updates that are required for an example set of five vehicles 102. These vehicles 102 are labeled as vehicle 102-1, vehicle 102-2, vehicle 102-3, vehicle 102-4, and vehicle 102-5. It should be noted that these vehicles 102 may refer to a single vehicle 102 or to a collection, type, or model of vehicles 102. Regardless, each of the vehicles 102-1 through 102-5 may for various configurations reasons have different software OTA requirements (e.g., different mode, different software or hardware installed to their ECUs 104, different software subscription levels, etc.).

As shown, the same numbering and shading indicates the same software update 202, except that the grey shading indicates a unique file for that vehicle 102. The vehicle 102-1 requires four software updates 202: update 202-1, update 202-2, update 202-3, and a software update 202-6 specific to that vehicle 102-1. The vehicle 102-2 requires five software updates 202: update 202-3, update 202-4, update 202-5, and two different software updates 202-7 and 202-8 specific to that vehicle 102-2. The vehicle 102-3 requires three software updates 202: update 202-2, update 202-3, and update 202-4. The vehicle 102-4 requires five software updates 202: update 202-1, update 202-2, update 202-4, update 202-5, and a software update 202-9 specific to the vehicle 102-4. The vehicle 102-5 requires three software updates 202: update 202-1, update 202-2, and update 202-5.

The update manager application 122 may be configured to identify the aggregate common package 130 as a set of the software updates 202 that includes those software updates 202 that are in common across the vehicles 102. In this case, that set of updates includes updates 202-1, 202-2, 202-3, 202-4, and 202-5. This set is shown in FIG. 2.

Figure 3:
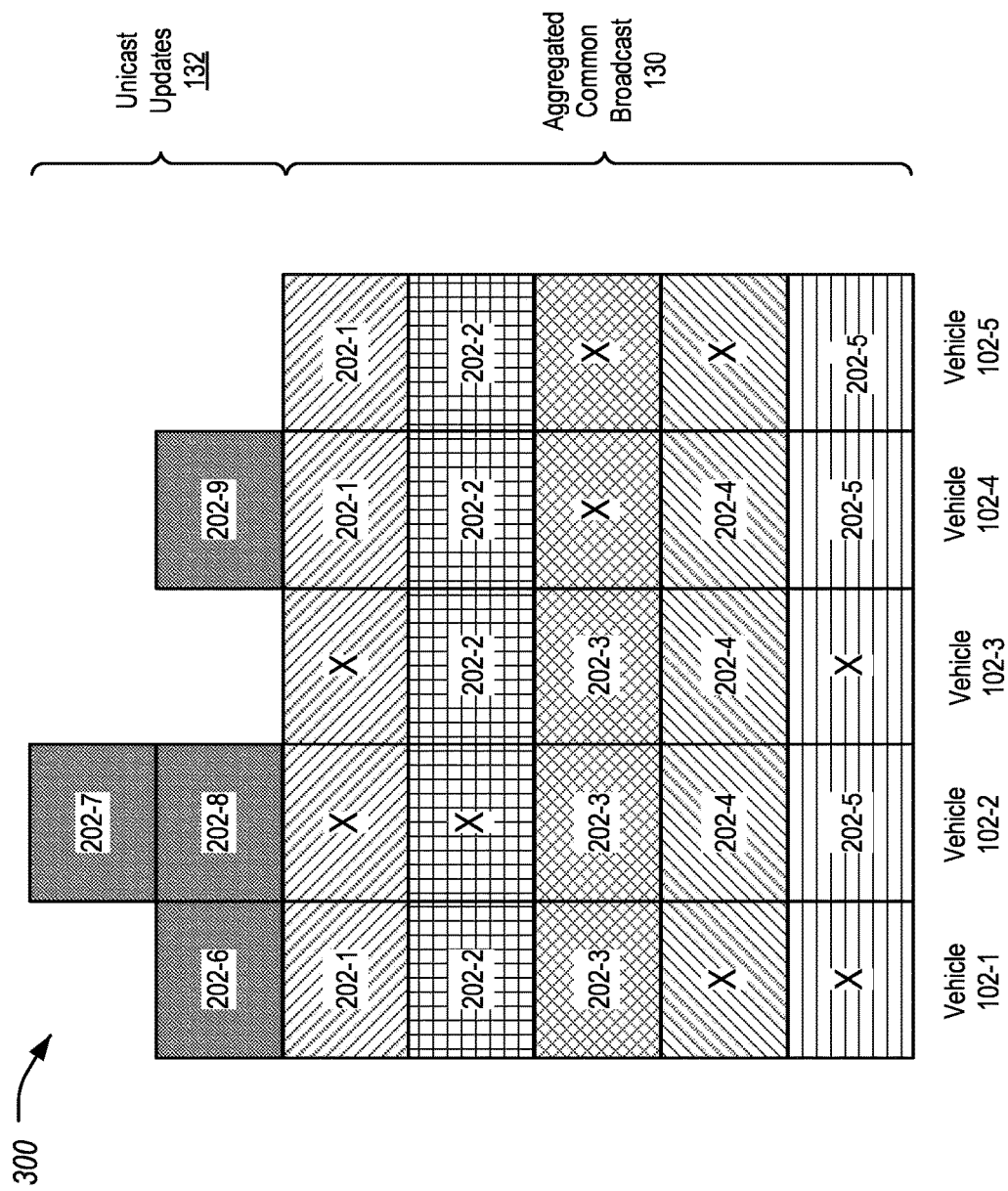
FIG. 3 illustrates an example of use of the aggregate common package for sending software updates to the example set of five vehicles.

FIG. 3 illustrates an example 300 of use of the aggregate common package 130 for sending software updates 202 to the example 200 set of five vehicles 102. This common package is broadcast to all the vehicles 102 within the geographic area 118 of the ATSC transmitter 116. If a software update 202 from the aggregate common package 130 is not intended for a vehicle 102, this file is shown in the example 300 with an "X" indication. In some examples, the aggregate common packages 130 may indicate which vehicles 102 should or should not install which of the software updates 202 included in the aggregate common package 130. This information may be based, for example, on information provided by the vehicle 102 in the probe results 128. For instance, the software updates 202 may be indexed to ECU 104 versions or other information provided in the probe results 128. The unique software update 202 identified by the update manager application 122 may be delivered via unicast to the vehicles 102, e.g., via the cellular network 112.

It should be noted that, in some examples the update server 120 may determine whether there would actually be a savings in resources and/or charge (e.g., price for sending the data, radio frequency (RF) usage, time needed, charge incurred to the original equipment manufacturer (OEM), data size, etc.) before generating and broadcasting the aggregate common package 130. For instance, without an aggregate common package 130 broadcast, the original five vehicles 102-1 through 102-5 (excluding the software updates 202-6 through 202-9 that are specific to a vehicle 102) would require 20 units of broadcast or unicast data. This can be seen by simply counting up the software update 202 elements in the example 200.

Using the broadcast of the aggregate common package 130 broadcast, the original five vehicles 102-1 through 102-5 would only need 5 units of broadcast data. The unique software updates 202 may utilize cellular unicast to deliver in either approach. The update server 120 analyses the resources for unicast based on volume as follows:

$$\text{Resources}_{unicastAll} = \sum_{Vehicle=1}^{n} \text{Resources}_{perUpdate} * \text{Volume}_{Vehic}$$

$$\text{Resources}_{broadcastUnicast} =$$
$$\text{Resources}_{unicastAll} + \text{Broadcast}_{weigh} * \text{Resources}_{broadcastOnly}$$

The update server 120 may compare if the above resource utilization with the incurred charge is smaller than the charge for the 20 units of sending all the software updates 202 via unicast. If yes, the aggregate common package 130 may be preferred. It should be noted that the per unit resource usage for broadcasting via the ATSC transmitter 116 to a single vehicle 102 may exceed that of the per unit resource usage of unicasting the same data to via the cellular network 112. Thus, to choose to use broadcast may involve overcoming the additional per-unit resource usage for utilizing the ATSC receiver 114.

It should also be noted that this simplified analysis assumes a single broadcast of the software updates 202, that the volume is the same for each vehicle 102 (e.g., one of each, ten of each, etc.), and that each of the software update 202 is of the same size. Thus, the analysis may weight the quantity requires of each vehicle 102 configuration as well as weight each of the software update 202 according to its size to determine a more complete measure of the resource utilization.

Figure 4:
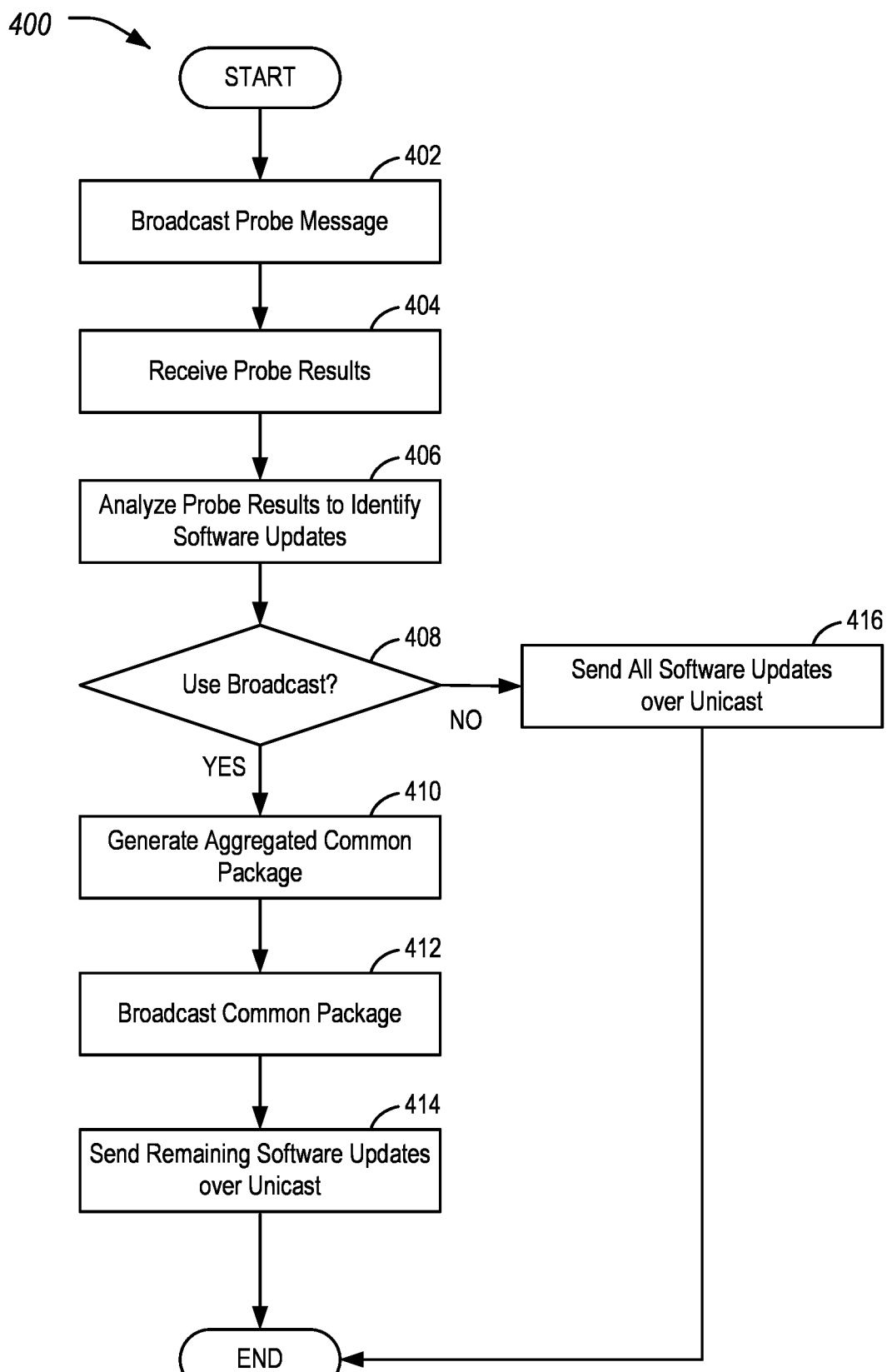
FIG. 4 illustrates an example process for the generation and broadcast of aggregate common package by the update server for delivery of software updates to vehicles.

FIG. 4 illustrates an example process 400 for the generation and broadcast of aggregate common packages 130 by an update server 120 for delivery of software updates 202 to vehicles 102. In an example, the process 400 may be performed by the update server 120 executing the update manager application 122, in the context of the system 100.

At operation 402, the update server 120 broadcasts a probe message 126. In an example, the update server 120 may send the probe message 126 to a plurality of vehicles 102 via cellular towers 110 of the cellular network 112. In another example, the update server 120 may send the probe message 126 to the plurality of vehicles 102 via the ATSC transmitter 116. In examples, where the probe message 126 is sent via the ATSC transmitter 116, the vehicles 102 may reply via the cellular network 112 as the ATSC transmitter 116 is a one-way transmission. In some examples, the update server 120 may separately probe by sending the probe message 126 to each ATSC transmitter 116 at a different time. In another example, the probe message may include a specific time for vehicles to send responses. This may allow the update server 120 to advantageously receive responses at desired time (e.g. 9 am Monday, 5 pm Friday, etc.) from those vehicles 102 that are the geographic area 118 of the ATSC transmitter 116. At operation 404, the update server 120 receives probe results 128 from the plurality of vehicles 102. These probe result 128 may be received via the cellular network 112, for instance.

At operation 406, the update server 120 analyzes probe results 128. In an example, responsive to the probe message 126, each of the vehicles 102 may reply with probe results 128. These probe results 128 may identify the vehicle 102 model, ECU 104 hardware and/or software versions, and/or other aspects of the vehicle 102 that may relate to what software updates 202, if any, should be provided to the vehicle 102. If it is not inherent from the probe message 126 being sent via the ATSC transmitter 116, the probe results 128 may also indicate which, if any of the ATSC transmitters 116 that the ATSC receiver 114 is receiving transmissions from.

At operation 408, the update server 120 determines whether to use broadcast or unicast. To do so, the update server 120 analyses the volume of vehicles 102 that require software update 202. An example analysis is discussed above with respect to FIG. 3. If broadcast is indicated based on the analysis, control passes to operation 410. Otherwise, control passes to operation 416.

At operation 410, the update server 120 generates the aggregate common package 130. In an example, the aggregate common package 130 may be generated as including those software updates 202 that are to be received by a plurality of the vehicles 102.

At operation 412, the update server 120 broadcasts the aggregate common package 130. In an example, the aggregate common package 130 may be send by the update server 120 to the ATSC transmitter 116, to be sent to any vehicles 102 in the geographic area 118 of the ATSC transmitter 116. This may allow the ATSC receivers 114 of the vehicles 102 to receive the aggregate common packages 130.

At operation 414, the update server 120 sends the remaining software updates 202 that are not part of the aggregate common package 130 over unicast. These transmissions of the remaining software updates 202 may be performed via unicast update 132 over the cellular towers 110 of the cellular network 112. After operation 414, the process 400 ends.

At operation 416, the update server 120 sends the software updates 202 over unicast. These transmissions of the software updates 202 may be performed via unicast update 132 over the cellular towers 110 of the cellular network 112. After operation 416, the process 400 ends.

Figure 5:
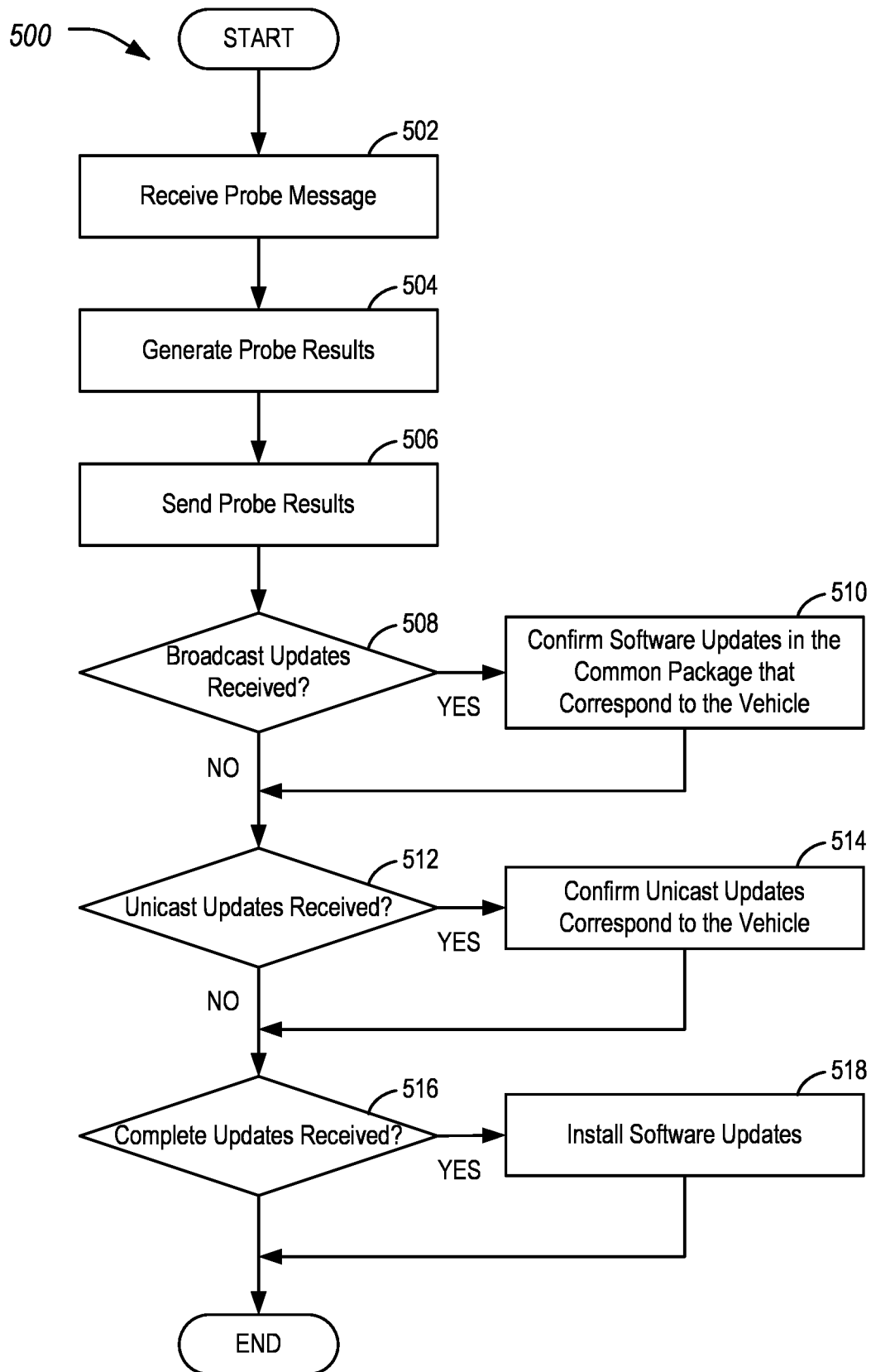
FIG. 5 illustrates an example process for the use of aggregate common packages by the vehicle in the delivery of software updates.

FIG. 5 illustrates an example process 500 for the use aggregate common packages 130 by the vehicle 102 for the delivery of software updates 202. In an example, the process 500 may be performed by one of the vehicles 102 utilizing the TCU 108 to execute the update application 124 in the context of the system 100.

At operation 502, the vehicle 102 receives the probe message 126. In an example, the vehicle 102 may receive the probe message 126 sent by the update server 120 at operation 402 of the process 400.

At operation 504, the vehicle 102 generates the probe result 128. In an example, the TCU 108 may collect vehicle 102 model, ECU 104 hardware and/or software versions, and/or other aspects of the vehicle 102 that may relate to what software updates 202, if any, should be provided to the vehicle 102. This information may be included in the probe results 128. As noted above, the probe results 128 may also in some examples indicates one or more ATSC transmitters 116 from which the ATSC receiver 114 of the vehicle 102 may be able to receive broadcasts. At operation 506, the vehicle 102 sends the generated probe results 128 to the update server 120. For example, the probe results 128 may be sent using the cellular network 112.

At operation 508, the vehicle 102 determines whether software updates 202 were received over broadcast. In an example, the vehicle 102 may receive the aggregate common package 130 from the ATSC receiver 114. The aggregate common package 130 may have been provided to the ATSC transmitter 116 by the update server 120 at operation 412. If such an aggregate common package 130 is received, control passes to operation 510. If not, control proceeds to operation 512.

At operation 510, the vehicle 102 confirms which of the software updates 202 in the aggregate common package 130 correspond to the vehicle 102. In some examples, the aggregate common packages 130 may indicate which vehicles 102 should or should not install which of the software updates 202 included in the aggregate common package 130. This information may be based, for example, on information provided by the vehicle 102 in the probe results 128. For instance, the software updates 202 may be indexed to ECU 104 versions or other information provided in the probe results 128. The vehicle 102 may accordingly use this information to identify only those software update 202 from the aggregate common package 130 to be installed to the vehicle 102.

At operation 512, the vehicle 102 determines whether software updates 202 were received over unicast update 132. In an example, the vehicle 102 may receive one or more software updates 202 via unicast update 132 from the TCU 108. These software updates 202 may have been sent from the update server 120 at operations 414 or 416 of the process 400.

At operation 514, the vehicle 102 confirms that the software updates 202 received over unicast update 132 correspond to the vehicle 102. In an example, the vehicle 102 may confirm that software updates 202 correspond to the ECU 104 versions or other characteristics of the vehicle 102.

At operation 516, the vehicle 102 determines whether software updates 202 has been received. If so, control passes to operation 518 to install the software updates 202. If software updates 202 have not been received, the process 500 ends without installation of the software updates 202. In other examples, not shown, the process 500 may return to operation 508 to await further software updates 202 that correspond to the probe results 128. At operation 518, the vehicle 102 installs the software updates 202. After operation 518, the process 500 ends.

Figure 6:
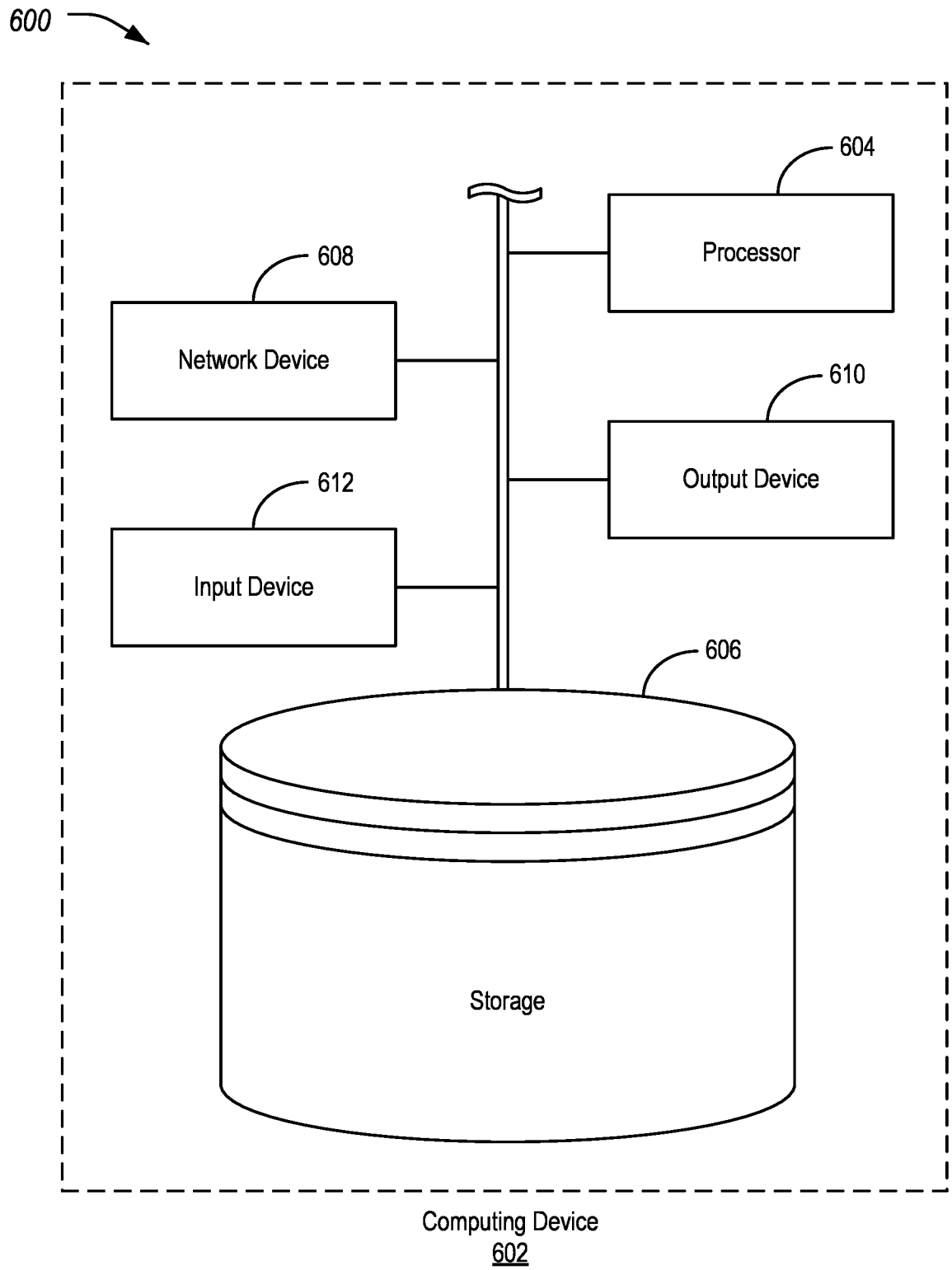
FIG. 6 illustrates an example of a computing device for use in the delivery of software updates to vehicles.

FIG. 6 illustrates an example 600 of a computing device 602 for use in the delivery of software updates 202 to vehicles 102. Referring to FIG. 6, and with reference to FIGS. 1-5, the vehicles 102, ECUs 104, TCUs 108, cellular towers 110, ATSC receivers 114, ATSC transmitters 116, and update server 120 may include examples of such computing devices 602. As shown, the computing device 602 may include a processor 604 that is operatively connected to a storage 606, a network device 608, an output device 610, and an input device 612. It should be noted that this is merely an example, and computing devices 602 with more, fewer, or different components may be used.

The processor 604 may include one or more integrated circuits that implement the functionality of a central processing unit (CPU) and/or graphics processing unit (GPU). In some examples, the processors 604 are a system on a chip (SoC) that integrates the functionality of the CPU and GPU. The SoC may optionally include other components such as, for example, the storage 606 and the network device 608 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 604 executes stored program instructions that are retrieved from the storage 606. The stored program instructions, accordingly, include software that controls the operation of the processors 604 to perform the operations described herein. The storage 606 may include both non-volatile memory and volatile memory devices. The non-volatile memory includes solid-state memories, such as not and (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 610. The output device 610 may include a graphical or visual display device, such as an electronic display screen, projector, printer, or any other suitable device that reproduces a graphical display. As another example, the output device 610 may include an audio device, such as a loudspeaker or headphone. As yet a further example, the output device 610 may include a tactile device, such as a mechanically raiseable device that may, in an example, be configured to display braille or another physical output that may be touched to provide information to a user.

The input device 612 may include any of various devices that enable the computing device 602 to receive control input from users. Examples of suitable input devices that receive human interface inputs may include keyboards, mice, trackballs, touchscreens, voice input devices, graphics tablets, and the like.

The network devices 608 may each include any of various devices that enable the vehicles 102, TCUs 108, cellular towers 110, ATSC transmitter 116, update server 120 and to send and/or receive data from external devices over networks (such as the communications network). Examples of suitable network devices 608 include an Ethernet interface, a Wi-Fi transceiver, a cellular transceiver, a satellite transceiver, a vehicle-to-everything (V2X) transceiver, a BLUETOOTH or BLUETOOTH Low Energy (BLE) transceiver, or other network adapter or peripheral interconnection device that receives data from another computer or external data storage device, which can be useful for receiving large sets of data in an efficient manner.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for delivering software updates, comprising:
an update server, including a memory storing instructions and one or more hardware processors, the update server being in communication with an Advanced Television Systems Committee (ATSC) transmitter and with a cellular network, programmed to execute the instructions using the one or more hardware processors to perform operations including to:
broadcast a probe message to a plurality of vehicles;
receive probe results from the plurality of vehicles, responsive to the broadcast, each of the probe results including hardware and software versions of electronic control units (ECUs) of a respective vehicle of the plurality of vehicles to be updated and an indication of the ATSC transmitter that the respective vehicle to be updated is receiving from;
analyze the probe results to determine software updates to send to the plurality of vehicles, including determining the software updates based on the hardware and software versions of the ECUs indicated in the probe results and determining based on the indication of the ATSC transmitter in the probe results which of the plurality of vehicles are within a geographic area of reception from the ATSC transmitter;

generate, for transmission using the ATSC transmitter, an aggregate common package including the software updates in common with at least a subset of the plurality of vehicles determined, based on the probe results, to be within the geographic area of reception from the ATSC transmitter;

send the aggregate common package to the plurality of vehicles using the ATSC transmitter; and send any remaining portion of the software updates not included in the aggregate common package to the plurality of vehicles over the cellular network to cause the plurality of vehicles to install the software updates.

2. The system of claim 1, wherein the update server is further programmed to broadcast the probe message using the ATSC transmitter and receive the probe results using the cellular network.

3. The system of claim 1, wherein the update server is further programmed to:

determine a first resource usage for sending the software updates in common using unicast via the cellular network, wherein the first resource usage is computed based on a quantity of vehicles to receive each software update, a data size of each software update, and a charge incurred for sending the data size of each software update, times the quantity of vehicles, via unicast;

determine a second resource usage for sending the software updates in common using broadcast via the ATSC transmitter, wherein the second resource usage is computed based on the quantity of vehicles to receive the aggregate common package, a per unit resource usage for sending data via broadcast, the data size of each software update, and a charge incurred for sending the aggregate common package via broadcast; and generate the aggregate common package responsive to the second resource usage indicating less resource usage.

4. The system of claim 3, wherein the update server is further programmed to send all of the software updates to the plurality of vehicles over the cellular network responsive to the first resource usage being lower than the second resource usage.

5. The system of claim 1, wherein the probe results further indicate, per vehicle of the plurality of vehicles, a vehicle model of the vehicle to be updated.

6. A method for delivering software updates, comprising:

broadcasting, by an update server in communication with an Advanced Television Systems Committee (ATSC) transmitter and with a cellular network, a probe message to a plurality of vehicles;

receiving, by the update server, probe results from the plurality of vehicles, responsive to the broadcasting, each of the probe results including hardware and software versions of electronic control units (ECUs) of a respective vehicle of the plurality of vehicles to be updated and an indication of the ATSC transmitter that the respective vehicle to be updated is receiving from;

analyzing, by the update server, the probe results to determine software updates to send to the plurality of vehicles, including determining the software updates based on the hardware and software versions of the ECUs indicated in the probe results and determining based on the indication of the ATSC transmitter in the probe results which of the plurality of vehicles are within a geographic area of reception from the ATSC transmitter;

generating, by the update server for transmission using the ATSC transmitter, an aggregate common package including the software updates in common with at least a subset of the plurality of vehicles determined, based on the probe results, to be within the geographic area of reception from the ATSC transmitter;

sending, by the update server using the ATSC transmitter, the aggregate common package to the plurality of vehicles; and sending, by the update server over the cellular network, any remaining portion of the software updates not included in the aggregate common package to the plurality of vehicles to cause the plurality of vehicles to install the software updates.

7. The method of claim 6, further comprising broadcasting the probe message using the ATSC transmitter and receive the probe results using the cellular network.

8. The method of claim 6, further comprising:

determining a first resource usage for sending the software updates in common using unicast via the cellular network, wherein the first resource usage is computed based on a quantity of vehicles to receive each software update, a data size of each software update, and a charge incurred for sending the data size of each software update, times the quantity of vehicles, via unicast;

determining a second resource usage for sending the software updates in common using broadcast via the ATSC transmitter, wherein the second resource usage is computed based on the quantity of vehicles to receive the aggregate common package, a per unit resource usage for sending data via broadcast, the data size of each software update, and a charge incurred for sending the aggregate common package via broadcast; and generating the aggregate common package responsive to the second resource usage indicating less resource usage.

9. The method of claim 8, further comprising sending all of the software updates to the plurality of vehicles over the cellular network responsive to the first resource usage being lower than the second resource usage.

10. The method of claim 6, wherein the probe results further indicate, per vehicle of the plurality of vehicles, a vehicle model of the vehicle to be updated.

* * * * *